(12) United States Patent
Jöhr

(10) Patent No.: US 7,019,251 B2
(45) Date of Patent: Mar. 28, 2006

(54) METHOD FOR PRODUCING LAMELLA PACKETS FOR ADJUSTABLE STEERING COLUMNS

(75) Inventor: Hans Jöhr, Kehrsatz (CH)

(73) Assignee: Adval Tech Holding AG, Niederwangen (CH)

( * ) Notice: Subject to any disclaimer, the term of this patent is extended or adjusted under 35 U.S.C. 154(b) by 113 days.

(21) Appl. No.: 10/481,491

(22) PCT Filed: Jun. 17, 2002

(86) PCT No.: PCT/CH02/00326

§ 371 (c)(1),
(2), (4) Date: Dec. 17, 2003

(87) PCT Pub. No.: WO03/000453

PCT Pub. Date: Jan. 3, 2003

(65) Prior Publication Data

US 2004/0182829 A1    Sep. 23, 2004

(30) Foreign Application Priority Data

Jun. 21, 2001    (CH) .................................. 1135/01

(51) Int. Cl.
B23K 11/00    (2006.01)
B23K 11/14    (2006.01)
(52) U.S. Cl. ..................... 219/117.1; 219/93; 219/107
(58) Field of Classification Search ................ 219/645, 219/117.1, 107, 93
See application file for complete search history.

(56) References Cited

U.S. PATENT DOCUMENTS

| | | | | | |
|---|---|---|---|---|---|
| 2,830,168 | A | * | 4/1958 | Taylor | 219/91.23 |
| 3,805,014 | A | * | 4/1974 | Becker | 219/93 |
| 5,473,133 | A | * | 12/1995 | Peterson | 219/93 |
| 6,354,950 | B1 | * | 3/2002 | Weiss | 464/95 |
| 6,548,780 | B1 | * | 4/2003 | Lewis | 219/93 |
| 6,810,574 | B1 | * | 11/2004 | Luthi et al. | 29/525.06 |

FOREIGN PATENT DOCUMENTS

| | | |
|---|---|---|
| DE | 2402110 A1 | 7/1975 |
| WO | WO0128710 A1 | 4/2001 |
| WO | WO03000453 A | 1/2003 |

OTHER PUBLICATIONS

*Designing Shapes for Projection Welding*, Tech Briefs, Machine Design, 60 (1988) Jun. 9, No. 13. Cleveland, Ohio, U.S.

* cited by examiner

Primary Examiner—Kevin Kerns
Assistant Examiner—Michael Aboagye
(74) Attorney, Agent, or Firm—Tarolli, Sundheim, Covell & Tummino L.L.P.

(57) ABSTRACT

The invention relates to a method for producing lamella packets (e.g. 70) such as those used for adjustable steering columns in automobiles. According to the invention, at least one of the lamellae (e.g. 71) is provided with a collar (71.1) and is joined to another lamella (e.g. 72) so that the collar (71.1) of the first lamella (71) is supported against the other lamella (72) whereby defining the width (B) of a space between the lamellae (71, 72). Both lamellae (71, 72) are welded at at least one location of the collar (71.1). The welding is preferably carried out by resistance welding. In order to obtain defined ratios, the edge of the lamella collar (71.1) is preferably provided with projecting points (Z). The method is, among other things, advantageous in that the same material quality can be used for all lamellae (1–74).

6 Claims, 3 Drawing Sheets

METHOD FOR PRODUCING LAMELLA PACKETS FOR ADJUSTABLE STEERING COLUMNS

TECHNICAL FIELD

The present invention relates to a method for producing lamella packets, as are used for adjustable steering columns in cars, at least one of the lamellae being provided with a collar and being joined to another lamella in such a manner that the collar of the one lamella is supported against the other lamella and thereby determines the width of a gap between the lamellae.

PRIOR ART

WO 01/28710 discloses a method of this type, this document also discussing the design of the lamella packets as longitudinal and height lamellae and explaining the function thereof.

In the previously known method, the lamella packets are composed in each case of at least one soft lamella made of a softer sheet-metal material and of at least one hard lamella made of a harder sheet-metal material, a rivet being produced from the softer lamella in order to connect the lamellae. This connection technique has the advantage of not requiring and having to supply any additional components in order to connect the lamellae. However, the method requires the use of two presses because of the different materials. Only the soft lamellae are produced in the one press and the hard lamellae are produced in the other press. The soft lamellae are transported from the one press into the other press where the lamellae are also stacked, and the rivet is produced from the soft disk. The two different materials are necessary because the rivet cannot be formed from the harder material and, on the other hand, the softer material does not withstand the loads to which the lamella packets are subjected. In the known method, the number of lamellae in the packet is also determined by the maximum possible rivet height.

SUMMARY OF THE INVENTION

The invention has set itself the object of specifying a method of the type mentioned at the beginning which is less costly in terms of material and manufacturing technology and in which the number of lamellae in the packet can also largely be freely selected. This object is achieved according to the invention by a method as characterized in patent claim 1. According to this, the lamellae are welded to each other at at least one location on the collar.

The advantages of the method according to the invention are:
  only one tool, for example in the form of a follow-on composite tool, is required per lamella packet (longitudinal and vertical lamellae);
  only one press is required;
  the number of lamellae per packet can be selected relatively freely and is not restricted by a limit provided by the ability of a rivet to be pulled out;
  the same quality of material can be used for all of the lamellae;
  only simple lamella geometries have to be produced, in particular no lamellae with high rivet collars, this having a simplifying effect on the design of the tools;
  the welding of the shafts can take place in a separate working step outside the press; this also has a simplifying effect on the design of the tools and, in addition, permits higher speeds of production.

According to a first preferred embodiment, the welding is implemented by resistance welding. In this connection, it is advantageous if the collar is produced in some sections at a height corresponding to the desired width of the gap between the lamellae, and is provided with at least one tooth protruding above the said height. The tooth is then melted back to the said height during the resistance welding. In order to receive the volume of the tooth or projecting point displaced in this process, depressions can be provided on the collar adjacent to the tooth. A plurality of teeth, in particular three teeth, are advantageously provided along the edge of the collar.

According to a further preferred embodiment, the same material is used for all of the lamellae.

BRIEF EXPLANATION OF THE FIGURES

The invention will be explained in greater detail below with reference to exemplary embodiments in conjunction with the drawings, in which.

WAYS OF IMPLEMENTING THE INVENTION

Figure 1:
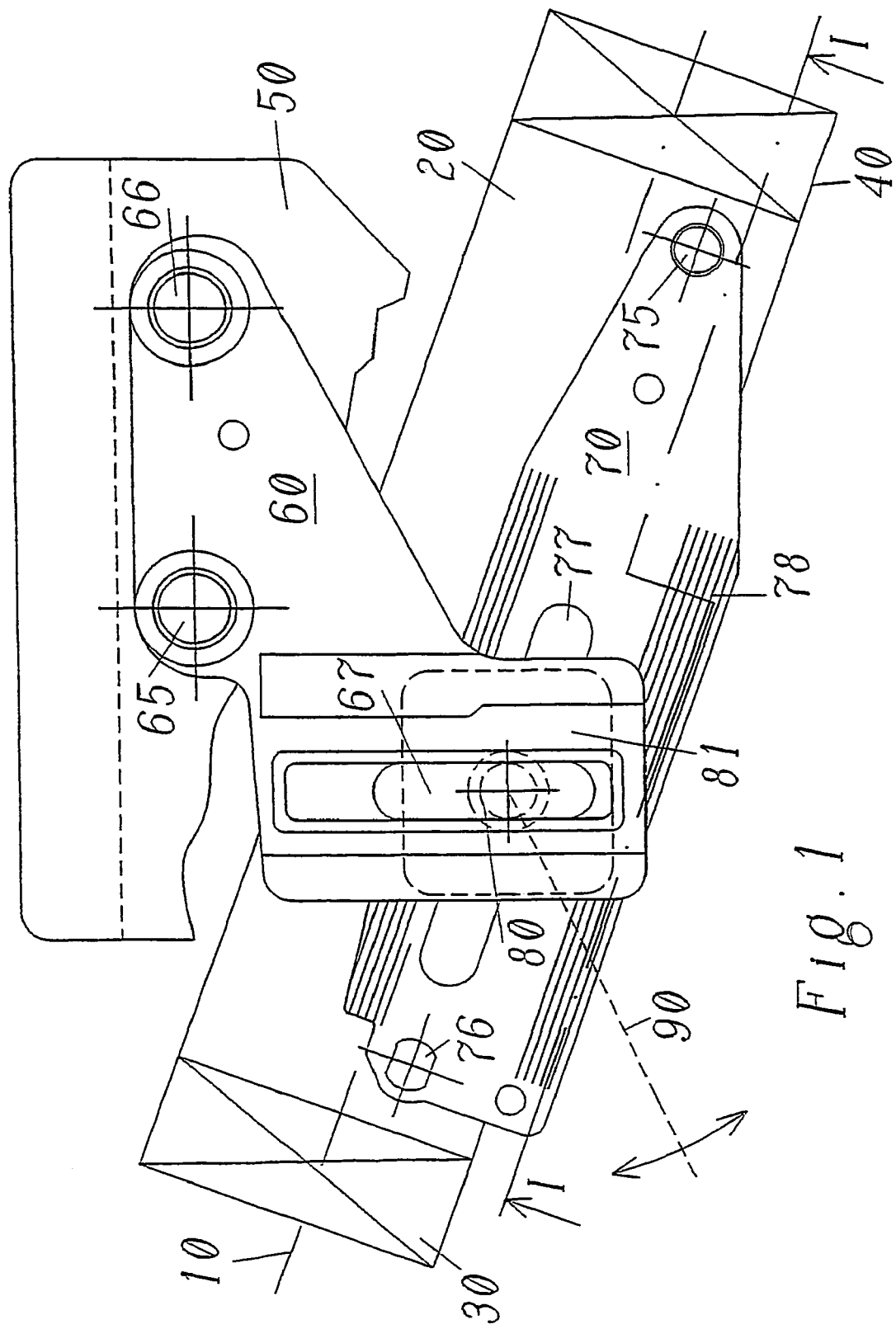
FIG. 1 shows the core piece of an adjustable steering column of a car with a packet of height or vertical lamellae and a packet of longitudinal lamellae.

FIG. 1 shows the core piece of an adjustable steering column of a car, the axis of the steering column being indicated by 10, a guide box by 20, two bearings for the steering column in the guide box by 30 and 40, a retaining shackle, only part of which is illustrated and which is arranged in a bridge-like manner over the guide box 20 and is fixed on the chassis, by 50, and two lamella packets by 60 and 70. The lamella packet 60 is fastened to the retaining shackle 50 by means of two eyelets 65 and 66, and the lamella packet 70 is fastened to the guide box 20 likewise by means of two eyelets 75 and 76. A corresponding pair of lamella packets (which cannot be seen in FIG. 1) is arranged and fastened behind the guide box 20 in the same manner as the pair 60 and 70. The lamellae of the packet 60 have a vertically oriented guide slot 67 for the vertical adjustment of the steering column and are therefore referred to as vertical or height lamellae. A corresponding guide slot 77 is also provided in the lamellae of the packet 70, but this guide slot is oriented essentially horizontally and serves for the longitudinal adjustment of the steering column. The lamellae of the packet 70 are accordingly referred to as longitudinal lamellae. A clamping bolt 80 which is held in the guide box passes through the guide slots 67, 77 of the lamella packets 60 and 70, specifically of the two pairs in front of and behind the guide box 20. When the clamping bolt 80 is released, the longitudinal lamellae and, together with them via the guide box 20, the steering column can be displaced and pivoted longitudinally and vertically with respect to the vertical lamellae and therefore, via the retaining shackle 50, with respect to the chassis. In this case, the range of adjustment is predetermined and limited by the guide slots 67 and 77. The steering column can be locked in each desired position and pivoting position in the range of adjustment by clamping of the clamping bolt 80, it being possible for this to take place, for example, by means of a locking lever 90 (only indicated schematically). During the clamping, frictional surfaces 78 on the lamellae are pressed against each other.

Figure 2:
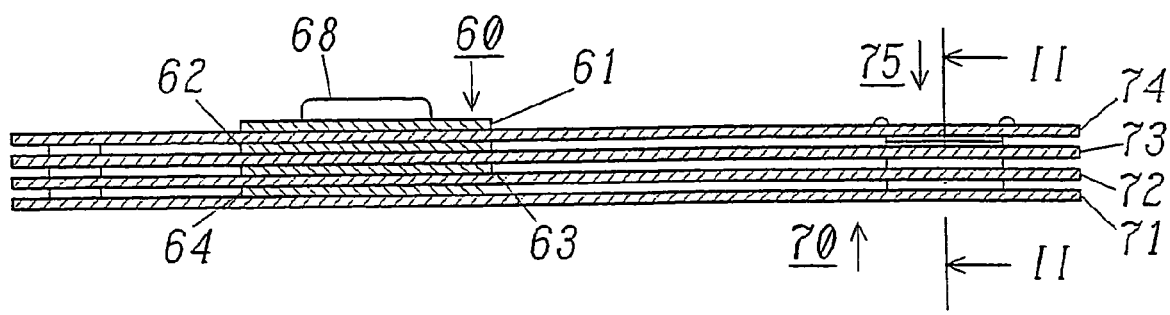
FIG. 2 shows the two lamella packets in section (I—I in FIG. 1)

FIG. 2 shows a section along the section line I—I in FIG. 1 through the two lamella packets 60 and 70, which are illustrated here with four lamellae 61–64 and 71–74 in each case, respectively. In principle, there could also be just two or three lamellae, but, if appropriate, also more of them. They also do not have to coincide in number in the two packets. As can be seen, the individual lamellae 61–64 and 71–74 of the two packets 60 and 70, respectively, are at a mutual distance approximately corresponding to their thickness, so that the packets can intermesh in such a manner that a lamella of one packet is followed in each case by a lamella of the other packet without a further gap in the layering. The mutual distance between the lamellae of each packet is defined and maintained by collars which are formed on three (61–63 and 71–73) of the four (61–64 and 71–74) lamellae of each packet of FIG. 2 along the edges of the eyelets 75 and 76 (and also 65 and 66). In the region of their mutual contacting surfaces, the lamellae can be provided with texturing, ribbing or the like (78 in FIG. 1) to increase their mutual frictional resistance. The uppermost lamella 61 of the packet 60 is also provided with a trough-shaped formation 68 around the guide slot 67, this formation serving as a guide for a head part 81 of the clamping bolt 80.

Figure 3:
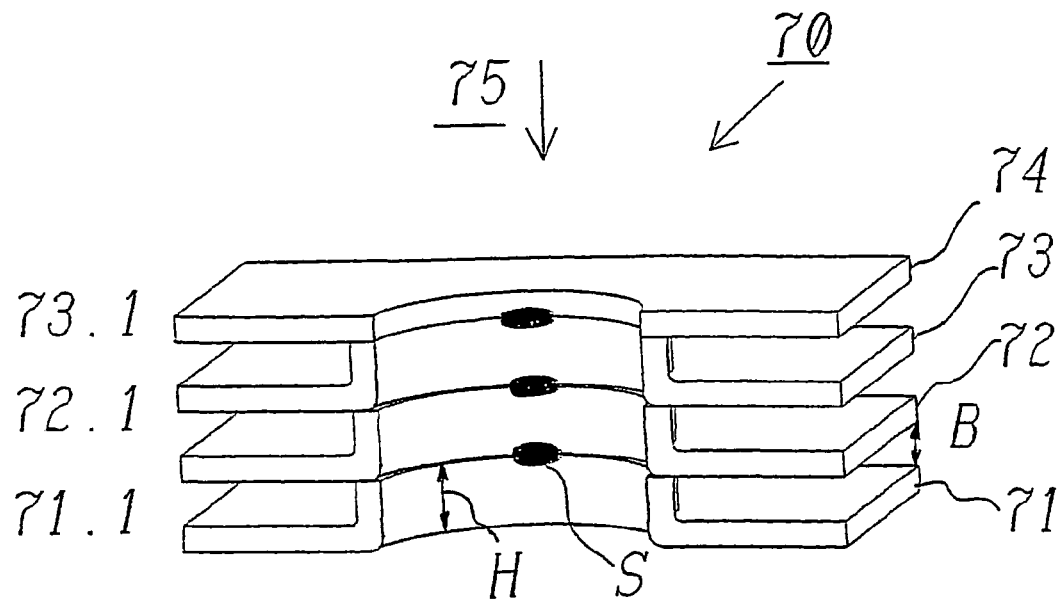
FIG. 3 shows, in a perspective illustration and cut away, the design of the lamella packets in the region of a fastening eyelet, the lamellae being welded to one another at this point.

FIG. 3 shows the region of the eyelet 75 of the lamella packet 70 schematically in a cutout. The collars 71.1, 72.1 and 73.1, which determine the width B of the gaps between the lamellae by means of their height H, can readily be seen here, the lamellae being welded to one another at points along the edges of the collars. One of the welding points is indicated in FIG. 4 by S.

According to the invention, the lamellae are preferably welded by resistance welding. During the resistance welding, the metal parts which are to be welded to one another are brought into contact with one another and are then connected to the poles of a source of current. The current then flowing over the contact surface of the metal parts produces heat in the environment of this surface, the heat causing the metal on both sides of the contact surface to liquefy and fuse together. It is favorable for the method if the geometry of the parts is selected in such a manner that the cross section for the flow of current in the region of its contact surface is minimal. The ohmic resistance is then conversely at its maximum there, and most of the heat loss occurs locally there.

Figure 5:
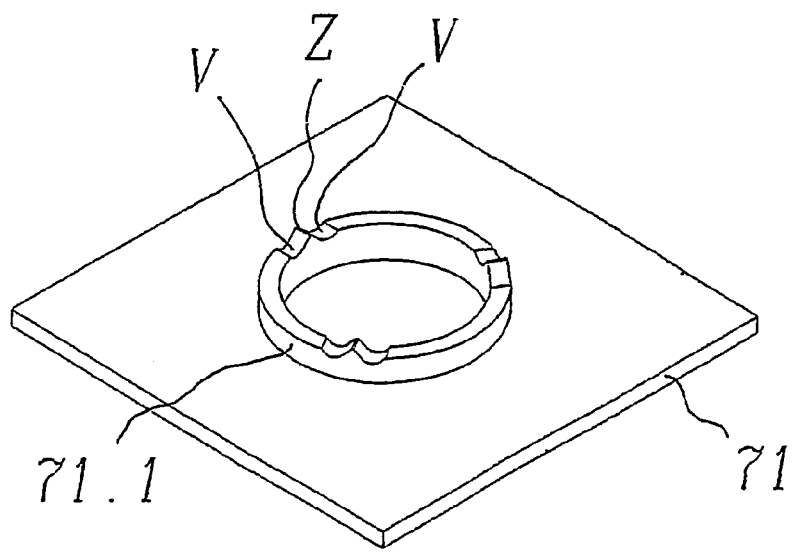
FIG. 5 shows an illustration of a detail of just one of the lower lamellae of the packet from FIG. 3 or 4.
Figure 4:
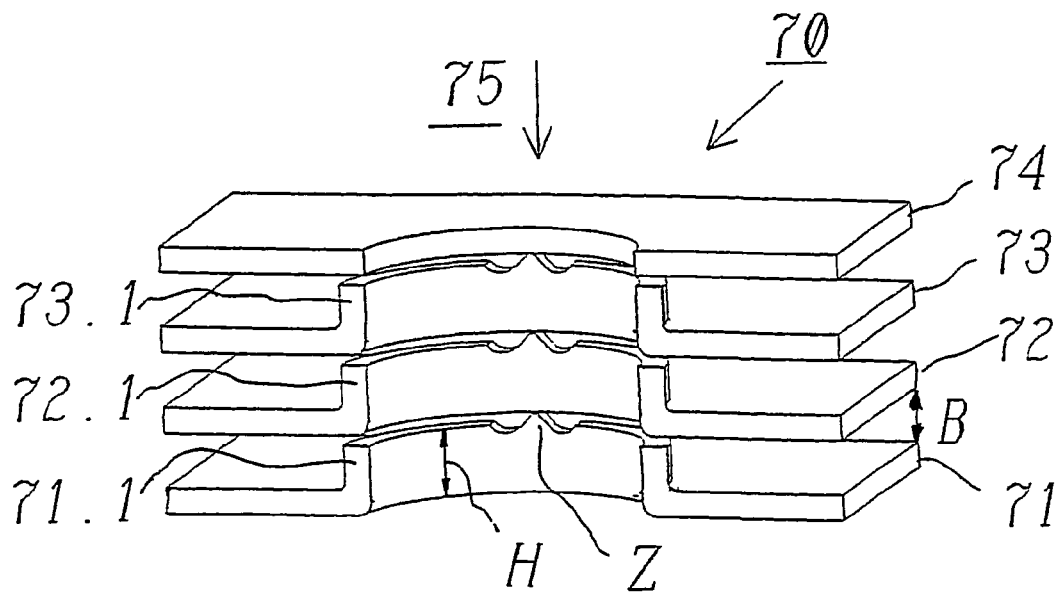
FIG. 4 shows, in the same illustration, the design of the lamella packets in the same region before the welding of the lamellae.

Correspondingly, as FIG. 4 shows and as can also be readily seen with reference to the individual illustration of a lamella part of FIG. 5, the edges of the collars of the lamellae are advantageously provided in each case with one or more teeth which protrude somewhat over the height H of the collars. In FIG. 4 and FIG. 5, just one of the teeth 5 in each case is indicated by Z. During the flow of welding current, the greatest heating occurs locally at these teeth, and leads to the said spot-type welding of the lamellae.

Owing to the teeth, the mutual distance between the lamellae and the width B of their gaps before welding is somewhat larger than the said height H, as can also be seen in FIG. 3. In order to set the distance between the lamellae to this height H, the lamellae are, for example, pressed against each other during the welding process. This causes the protruding teeth, as soon as they are liquefied, to be squeezed away until the remaining edge of the collar comes in each case into contact with the adjacent disk. The contact surface, which increases greatly in the process, between the lamellae causes the electrical resistance to drop to a similar extent and no further welding occurs. The flow of current can then be interrupted.

So that the excess welding material arising during the squeezing away of the teeth in the described manner can flow to a defined location, respective depressions can also be provided on both sides of the teeth in the edges of the collars, as is also illustrated in FIGS. 4 and 5. A pair of depressions of this type is indicated in both figures by V. In addition, the teeth can be formed in a manner such that they are offset radially somewhat to the outside with respect to the hole region of the eyelet in order to prevent the liquefied material of the teeth from flowing into this region.

For its implementation in terms of machinery for producing the lamellae, the method according to the invention requires just two tools (one for the vertical lamellae and one for the longitudinal lamellae), in particular follow-on composite tools, with which the lamellae are produced from one metal strip in each case in a number of steps. The two tools can be arranged in the same press. The lamellae are preferably also stacked one above another in each case in the tools. In contrast, the lamellae are preferably welded in a separate welding station arranged downstream of the press.

LIST OF REFERENCE NUMBERS

10 The axis of the steering column
20 Guide box
30, 40 Bearings for the steering column in the guide box
50 Retaining shackle fixed on the chassis
60 Vertical lamella racket, height lamella packet
61–64 Lamellae
65, 66 Fastening eyelets
67 Guide slot
68 Trough-shaped formation
70 Longitudinal lamella packet
71–74 Lamellae
71.1–73.1 Collars
75, 76 Fastening eyelets
77 Guide slot
78 Frictional surfaces 78
80 Clamping bolts 80
81 Head part of the clamping bolt 80
90 Locking lever for the clamping bolt 80
H Height of the collars
B Width of the lamella gaps
Z Teeth, projecting points
V Depressions on both sides of the teeth

What is claimed is:

1. A method for producing lamella packets (e.g. 70), as are used for adjustable steering columns in cars, at least one of the lamellae (e.g. 71) being provided with a collar (71.1) and being joined to another lamella (e.g. 72) in such a manner that the collar (71.1) of the one lamella (71) is supported against the other lamella (72) and thereby determines the width (B) of a gap between the lamellae (71, 72), characterized in that the two lamellae (71, 72) are welded to each other at at least one location (e.g. S) on the collar (71.1).

2. The method as claimed in claim 1, characterized in that the welding is implemented by resistance welding.

3. A method for producing lamella packets (e.g. 70), as are used for adjustable steering columns in cars, at least one of the lamellae (e.g. 71) being provided with a collar (71.1) and being joined to another lamella (e.g. 72) in such a manner that the collar (71.1) of the one lamella (71) is supported against the other lamella (72) and thereby determines the width (B) of a gap between the lamellae (71, 72), characterized in that the two lamellae (71, 72) are resistance welded to each other at at least one location (e.g. S) on the collar (71.1), the collar (71.1) being produced in some sections at a height (H) corresponding to the desired width (B) of the gap between the lamellae, and is provided with at least one tooth (Z) protruding above this height (H).

4. The method as claimed in claim 3, characterized in that the at least one tooth (Z) is melted back to the said height (H) during the resistance welding.

5. The method as claimed in claim 4, characterized in that respective depressions (V) for receiving the volume of the at least one tooth (Z) displaced during the resistance welding are provided on the collar (71.1) adjacent to the at least one tooth (Z).

6. The method as claimed in one of claim 1, characterized in that the same material is used for all of the lamellae (61–64, 71–74).

* * * * *